US009828562B2

(12) United States Patent
Barford

(10) Patent No.: US 9,828,562 B2
(45) Date of Patent: Nov. 28, 2017

(54) FIRELOG AND METHOD OF MAKING A FIRELOG

(71) Applicant: Standard Brands (UK) Limited, Leatherhead, Surrey (GB)

(72) Inventor: Eric Dennis Barford, Faro (PT)

(73) Assignee: STANDARD BRANDS (UK) LIMITED, Leatherhead, Surrey (GB)

(*) Notice: Subject to any disclaimer, the term of this patent is extended or adjusted under 35 U.S.C. 154(b) by 0 days.

(21) Appl. No.: 14/779,882

(22) PCT Filed: Mar. 26, 2013

(86) PCT No.: PCT/GB2013/000131
§ 371 (c)(1),
(2) Date: Sep. 24, 2015

(87) PCT Pub. No.: WO2014/155025
PCT Pub. Date: Oct. 2, 2014

(65) Prior Publication Data
US 2016/0060559 A1    Mar. 3, 2016

(51) Int. Cl.
*C10L 10/02*  (2006.01)
*C10L 5/36*  (2006.01)
(Continued)

(52) U.S. Cl.
CPC .............. *C10L 10/02* (2013.01); *C10L 5/14* (2013.01); *C10L 5/146* (2013.01); *C10L 5/365* (2013.01);
(Continued)

(58) Field of Classification Search
CPC .......... C10L 10/02; C10L 5/365; C10L 5/442; C10L 5/14; C10L 5/146; C10L 2290/24; C10L 2290/30; Y02E 50/10; Y02E 50/30
See application file for complete search history.

(56) References Cited

U.S. PATENT DOCUMENTS 3,240,573 A    3/1966 Eyre
3,297,419 A *  1/1967 Eyre, Jr. ............... C10L 11/04
                                            44/530
(Continued)

FOREIGN PATENT DOCUMENTS

CA     2511384 A1   1/2007
CN    101636475 A   1/2010
(Continued)

OTHER PUBLICATIONS

International Searching Authority, International Search Report for International Application No. PCT/GB2013/000131, dated Jun. 11, 2013.
(Continued)

*Primary Examiner* — Cephia D Toomer
(74) *Attorney, Agent, or Firm* — Honigman Miller Schwartz and Cohn LLP; Matthew H. Szalach; Jonathan P. O'Brien

(57) ABSTRACT

The present invention relates to a method of making a firelog, as well as to a firelog itself, and methods of using the firelog. The method of the present invention allows firelogs to be made that burn very cleanly. This is advantageous for the environment. Furthermore, the firelogs of the present invention can be burnt in a conventional fireplace, or in a stove. This is in contrast to the presently available firelogs which cannot be burnt in a stove.

14 Claims, 1 Drawing Sheet

(51) Int. Cl.
*C10L 5/44* (2006.01)
*C10L 5/14* (2006.01)

(52) U.S. Cl.
CPC ........... *C10L 5/442* (2013.01); *C10L 2290/24* (2013.01); *C10L 2290/30* (2013.01); *Y02E 50/10* (2013.01); *Y02E 50/30* (2013.01)

(56) References Cited

U.S. PATENT DOCUMENTS

| | | |
|---|---|---|
| 4,326,854 A | 4/1982 | Tanner |
| 4,333,738 A | 6/1982 | Schrader |
| 6,113,662 A | 9/2000 | Sprules |
| 2008/0196301 A1* | 8/2008 | de Oliveira ............. C10L 5/365 44/535 |

FOREIGN PATENT DOCUMENTS

| | | |
|---|---|---|
| EP | 2104727 A1 | 9/2009 |
| EP | 2108034 A1 | 10/2009 |
| WO | WO-2008076456 A1 | 6/2008 |

OTHER PUBLICATIONS

State Intellectual Property Office, First Office Action for CN Application No. 201380075025.1, dated Nov. 2, 2016.

* cited by examiner

FIRELOG AND METHOD OF MAKING A FIRELOG

CROSS-REFERENCE TO RELATED APPLICATIONS

This application claims priority under 35. U.S.C. §371 to Patent Cooperation Treaty Application No. PCT/GB2013/000131, filed Mar. 26, 2013, the entire contents of which are incorporated herein by reference.

FIELD OF INVENTION

The present invention relates to a method of making a firelog, as well as to a firelog itself, and methods of using the firelog. The method of the present invention allows firelogs to be made that burn very cleanly. This is advantageous for the environment. Furthermore, the firelogs of the present invention can be burnt in a conventional fireplace, or in a stove. This is in contrast to the presently available firelogs which cannot be burnt in a stove.

BACKGROUND TO THE INVENTION

Firelogs were invented in America in the 1970's by mixing sawdust with petroleum waxes. Originally a typical firelog weighed 2 to 2.5 kg, and burned for around 3 to 4 hours. Firelogs are very convenient. Since they burn for so long it is not necessary to regularly feed the fire with further fuel, as would be the case with regular fuel such as wood or coal. Firelogs typically are sold in packaging that itself can be lit, which makes them extremely clean and easy to burn and to store.

In recent years, the sharp increase in the costs of petroleum wax has led to the use of non-petroleum waxes, either alone or in addition to petroleum waxes. EP2104727 discloses an artificial firelog using non-petroleum waxes. EP2108034 discloses alternative fibre materials to sawdust, including agricultural by-products.

Firelogs such as those disclosed in EP2108034 and EP2104727 are made by heating the wax so that it is liquid and mixing it with the sawdust, or other cellulosic fibre. The mixture of fibre and wax is then cooled and formed into a firelog, typically by extrusion, moulding or compression. Extrusion is by far the most preferred method for the manufacture of firelogs, since it is much more economical to use a continuous extrusion method, than a moulding or compression method which is not continuous. In order to ensure that the mixture of wax and fibre can be formed into a firelog, it is necessary that the wax has certain properties. In particular, the wax must act as a binder to hold the fibres together in the firelog.

With the current climate of increasing environmental awareness, there is mounting pressure on fuel manufacturers to make their products as environmentally sound as possible. In the UK many built up areas, such as the City of London, are subject to strict regulations that all fuel burnt in these areas must meet. In particular, the Clean Air Act 1993, together with Regulations and Orders made under the Act, provide the current legislative control. Under this Act, Local Authorities may declare the whole or part of a district to be a Smoke Controlled Area. It is an offence to emit smoke from a chimney of a building, furnace or any fixed boiler in a designated Smoke Controlled area. Fuels can be authorised by a Statutory Instrument and currently authorised fuels include inherently smokeless fuels such as gas, electricity and anthracite, together with specific brands of manufactured solid smokeless fuels. These fuels have to pass tests to confirm that they are capable of burning in an open fireplace while producing smoke emissions of less than 5 grams per hour. In America, there is a similar test regulated by the EPA. The EPA test relates to the appliance rather than the fuel and sets a mandatory smoke emission limit for wood stoves of 7.5 grams per hour for non-catalytic stoves and 4.1 grams per hour for catalytic stoves. Throughout Europe and the rest of the world, similar regulations apply.

Saturated waxes in general are known to burn more completely, and in a much cleaner manner, than unsaturated waxes. As noted above, it is desirable to use non-petroleum waxes. However, non-petroleum saturated waxes, such as fatty triglycerides, fatty acid, fatty alcohol, fatty esters, are typically solid at room temperature and can be brittle. This means that using conventional manufacturing methods for firelogs, it is not generally possible to use 100% saturated non-petroleum waxes, as they are not sufficiently plastic to be able to act as a binder for the fibre and form a firelog. A mixture of fibre material and saturated non-petroleum wax usually cannot be extruded.

Instead, a saturated wax is generally blended with an unsaturated wax in order to form a wax blend which has the necessary binding properties to allow a firelog to be formed. EP2104727 gives an example of this, and requires a wax component which is solid at room temperature, i.e. a saturated compound, in a blend with a wax component which is not solid at room temperature, i.e. an unsaturated compound.

Since at the moment the wax component of a firelog generally contains an unsaturated component, which does not burn as cleanly as a saturated component and/or contains petroleum waxes, firelogs are not as environmentally friendly as is desirable. Many do not pass the UK smokeless test for use in a Smoke Controlled Area. The firelogs that do pass this test, which are currently on the market, contain a very carefully blended wax component consisting of expensive "clean" saturated waxes, along with some "dirty" unsaturated waxes which are necessary to ensure the necessary binding properties of the wax components, for formation for the firelog.

There is a need for firelogs that burn more cleanly, in order to better meet environmental concerns.

In addition to open fires, many households have closed stoves, such as wood burning stoves. The popularity of such stoves has increased greatly in recent years. Firelogs are generally not suitable for use in stoves because the firelog itself would not retain its integrity in the intense heat. In a stove environment a conventional firelog would slump, causing a large flare-up. This creates a safety issue, as such uncontrolled flames are very dangerous. It would be advantageous to create a firelog which had sufficient integrity on burning to make it suitable for use in a stove.

SUMMARY OF THE INVENTION

According to a first aspect, the present invention relates to a method of making a firelog, wherein the firelog comprises a fibre component, a wax component and an aqueous binder, the method comprising the steps of; (a) mixing the fibre component and the wax component together at a temperature above the drop point of the wax component; (b) simultaneously stirring and cooling the mixture of the fibre component and the wax component from step (a) to below the congealing temperature of the wax component; (c) mixing the cooled mixture of the fibre component and the wax component from step (b) with the aqueous binder; and then (d) extruding the mixture of the fibre component, the wax component and the aqueous binder from step (c) to form a firelog.

The method for making firelogs of the present invention is fundamentally different from prior art methods of making firelogs. In conventional methods of making firelogs, the wax component is used as a binder, and is mixed in a single step with the fibre component. The mixture is then cooled and extruded. Aqueous binders have been used before in firelogs, and are disclosed in EP2104727 and EP2108034, but are added in a single mixing step with the fibre component and the wax component. In this situation the wax rather than the aqueous binder acts to bind the fibre component together. In contrast to this, in the present invention the aqueous binder is added in a separate step to the cooled mixture of fibre component and wax component. Once the fibre component and wax component have been simultaneously stirred and cooled, the resulting mixture will be a "crumble" i.e. a particulate solid. These particles are then bound together with the aqueous binder. By using an aqueous binder in this way, in a separate step, the wax component is free from the constraint of needing to act as a binder which leads to a mixture which is suitable for extrusion. Accordingly, it is possible to use only saturated non-petroleum waxes, which burn cleanly but which are too brittle by themselves to sufficiently bind the fibre component for extrusion. It is no longer necessary to blend a saturated wax with an unsaturated wax in order to improve the binding properties of the wax component. Accordingly, the method of the present invention allows firelogs to be manufactured which burn more cleanly than has previously been possible. Furthermore, it is not necessary to incorporate expensive blending equipment into the manufacturing set-up to make a wax blend.

In a preferred embodiment of the invention, the wax component comprises at least 90%, preferably at least 95% or even 100% by weight fully saturated compounds. The saturated compounds are preferably triglycerides, fatty acids, fatty alcohols, fatty esters or a mixture of these compounds. These compounds are particularly advantageous because they all contain oxygen as part of the molecular structure. This means that a cleaner burn is achieved than when oxygen is not present, as the oxygen included in the compounds aids combustion.

It is preferable that the wax component is 100% "natural", i.e. non-petroleum.

As explained above, it is no longer necessary for the wax component to contain dirty burning unsaturated waxes. Preferably the wax component does not comprise unsaturated fatty triglycerides, unsaturated fatty acids, unsaturated fatty alcohols, unsaturated fatty esters, tall oil pitch, petroleum derived paraffin slack waxes, or petroleum derived microcrystaline slack waxes.

The second aspect of the invention relates to a firelog which is made by a method according to the first aspect of the invention.

The method of the present invention results in a firelog which is, itself, structurally different from firelogs made by a conventional a single step mixing method. This would be the case even if exactly the same components were used to make the firelog. This is because in the method of the present invention in step (a), the wax component becomes absorbed into the fibre component. In step (b) solid particles of the wax and fibre component are created. Most of the wax component, if not all of the wax component, is absorbed into the fibre component. Any wax component that is not absorbed into the fibre component solidifies on the outside of the particles of fibre and wax. By mixing the cooled particles of fibre component and wax component in step (c) with the aqueous binder, those particles become coated with aqueous binder. This leads to a honeycomb structure of solid particles comprising wax component and fibre component, in a matrix of aqueous binder. This is entirely different from prior art methods where the wax component is used as the binder. In these methods, when the wax component and the fibre component are mixed together, the non-absorbed wax component acts as the binder. Even where an aqueous binder is additionally included in the single mixing step, the wax component is the primary binder. Where an aqueous binder and wax component are added to the fibre component together in a single step, the aqueous binder is admixed with the wax component, so does not form a matrix around particles of wax component and fibre component in the same way as results from the method of the present invention.

Moreover, when aqueous binder is co-mixed with molten wax and cellulosic fibre in the conventional single step mixing process, the hydrophilic nature of fibre results in immediate absorption of the water from the aqueous binder. This essentially reverts the solids in the binder to the solid state. This means that the aqueous binder is unable to act in any way as a binder. In EP2104727 and EP2108034 aqueous additives are included in relatively low levels and act as a cheap source of high energy density extender for the fibre component. Under the two-stage mixing method of the present invention, by mixing the fibre with the wax in the first stage, the fibre interstices are completely preloaded with wax and any surplus wax then forms a bather around the fibre. When the aqueous binder is added in the second mixing step, immediate absorption of water from the aqueous binder is prevented. This allows the aqueous binder to retain it's ability to encapsulate the 'crumble' from the first stage mixing and so develop an extrudable, plastic mass. This is then used to make firelogs by continuous extrusion.

The firelog made by methods of the present invention has particular advantages over firelogs made by conventional methods. During storage, by the process of equilibration, water from the aqueous binder slowly migrates into the fibre component, which leads to the firelog overall becoming harder. When the firelog is burnt, the matrix of aqueous binder can form a char. This is particularly the case where the aqueous binder comprises a carbohydrate, as in a preferred embodiment of the invention. The aqueous binder is preferably molasses or starch mucilage. When the matrix turns to a char on burning, it forms a hard structure which ensures that the firelog does not collapse under intense heat such as in a stove, as is the case with firelogs made by conventional methods. In this way, the firelog of the present invention is believed to be the first firelog which can be safely used in a stove. Since stoves are increasingly popular, this represents a step forward in technology, with very obvious benefits over existing firelogs.

According to a third aspect of the present invention, a firelog according to the second aspect of the invention can be used in an open fire or in a stove.

DESCRIPTION

Figure 1:
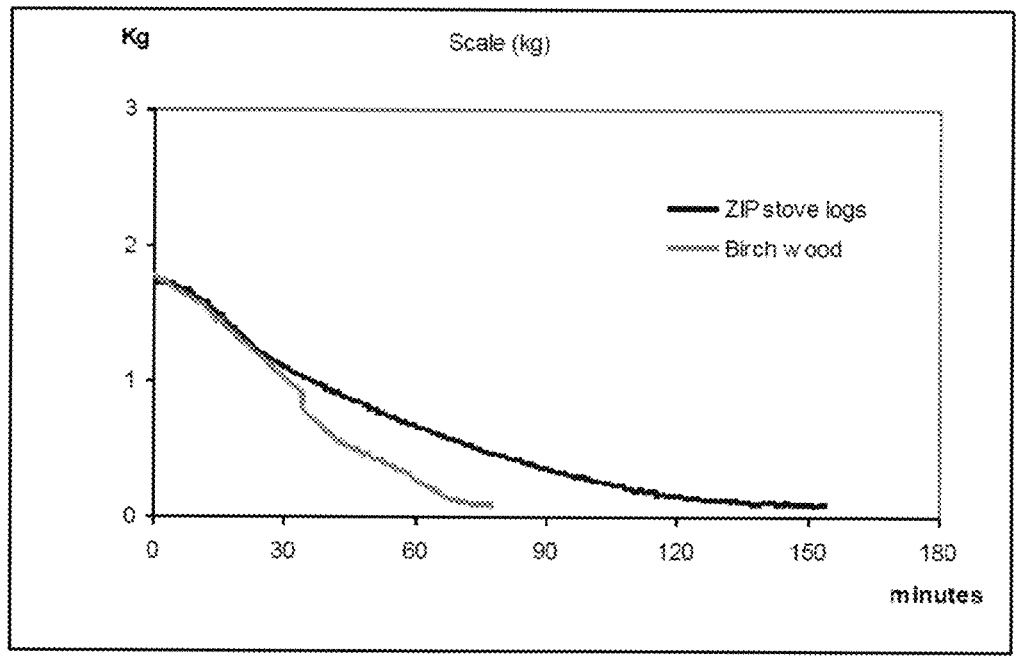
FIG. 1 is a graph showing the weight loss over time of a "Zip" firelog according to a preferred embodiment of the present invention versus birchwood.

As described above, the present invention relates to a method of making a firelog, wherein the firelog comprises a fibre component, a wax component and an aqueous binder. By firelog we mean a solid combustible unit. Firelogs are intended to be burnt on an open fire or, in the case of the present invention, in a stove. They are usually wrapped in a paper wrapping, which can itself be ignited in order to light the firelog. In Europe firelogs intended for an open fire will normally be in the range of 1 to 1.5 kg in weight, and burn for around 2 hours. Wood burning stoves are typically smaller than open hearths, and so a firelog intended for a stove will be in the region of 0.7 to 1 kg in weight, often around 0.85 kg. These "stove logs" will typically burn for between 1.5 and 2 hours. For a North American market, firelogs will normally be in the range of 1.45 kg-2.25 kg, and burn for up to about 3 hours, for either an open hearth or a stove.

The fibre component of the firelog can be any combustible fibrous material, such as any material that has been used for this purpose to date. For example, the fibre component can include wood particles, wood shavings, wood chips, sawdust, ground bark, shredded paper or cardboard, waxed cardboard, charcoal power, or agricultural waste material such as straw, grass clippings, leaves, rice husks, nut shells, ground olive pips, ground peach pips, grape pumice, walnut meal, ground prune pips, distillers grain or coffee grounds. The fibre component is preferably woodchips, from a wood such as coppice willow, which is annually renewable.

As explained above, one benefit of the present invention is that the wax component is not used primarily as a binder in the firelog of the present invention. Instead, an aqueous binder is provided. The wax component is used primarily as a combustible material thereby, adding to the energy that is released on burning the firelog. This is possible due to the manufacturing method of the present invention in which the aqueous binder is subsequently added to mixed cooled particles comprising the wax component and the fibre component. This is a radically different method for making firelogs from conventional methods. Since the wax component does not need to act as a binder, the rheology of the wax component is not as important as in conventional firelog manufacturing methods, when the wax component does act as a binder. Accordingly, it is possible to use a wax component that is harder, and more brittle, then has been possible in the past. This is advantageous because harder waxes tend to be more fully saturated than waxes which are soft or liquid at room temperature. Fully saturated compounds burn more cleanly than unsaturated compounds. Accordingly, the method of the present invention provides environmental benefits, since wax components that burn more cleanly can be used.

In a preferred embodiment, the wax component comprises by weight at least 90% fully saturated compounds, preferably at least 95% fully saturated compounds, more preferably 100% fully saturated compounds.

It is possible to use petroleum waxes in the wax component, particularly fully saturated petroleum waxes such as refined paraffin and refined microcrystalline waxes, where the inherent dirty burning oil content has been removed. However, the wax component preferably consists of non-petroleum derived compounds.

It is environmentally preferable to use a high percentage of natural waxes. In particular, the firelog wax component preferably comprises of at least 80% by weight, preferably 90% by weight, more preferably 100% natural waxes. By natural waxes we mean waxes from natural sources such as vegetable oil or animal fats, and not from fossil fuels, i.e. not petroleum derived compounds. The non-petroleum waxes can be characterised as fully hydrogenated combustible vegetable oils or animal fats or waxy materials including triglycerides, sterols, terpenes, fatty acids (preferably C12 to C22 fatty acids), fatty alcohols, glycerol derivatives and caster oil. It is preferred, as noted above, that the oils are fully saturated. Oils and soft waxes can be further hydrogenated to achieve this. In a preferred embodiment the wax component is selected from the group consisting of saturated triglycerides, saturated fatty acids, saturated fatty alcohols, saturated fatty esters, or mixtures thereof. Preferably the saturated compounds have 12 to 22 carbon atoms.

As explained above, by using the manufacturing method of the present invention, it is not necessary to use a blend of waxes. However, a blend can be used if desired.

The wax component can be characterised by a congealing point and a drop point. It is preferable in the present invention that the wax component has a congealing point of at least 48° C., as measured by the standard test method ASTM D938. It is also preferable that the wax component has a drop point of at least 55° C. as measured by the standard test method ASTM D566. Accordingly, the wax component will generally be a solid at room temperature.

Where the firelog is destined to be used in or transported across hot environments, it is, of course, important that the wax component does not melt prematurely. In this instance, fully hydrogenated caster wax can be included as part of the wax component as a small proportion (1% to 10% by weight) of the wax component. Fully hydrogenated caster wax has a particularly high congealing point and drop point. Incorporating a small proportion of this wax can significantly raise the congealing and drop points of the entire wax component.

In view of one of the objectives of the present invention, to provide a method of making a firelog which can burn cleanly, it is preferable that the wax component does not comprise "low saturation" (i.e. unsaturated) unsaturated fatty triglycerides, unsaturated fatty acids, unsaturated fatty alcohols, unsaturated fatty esters, tall oil pitch, petroleum derived paraffin slack waxes, or petroleum derived microcrystaline slack waxes.

The aqueous binder is used in the present invention in step (c), where it is mixed with the cooled particles of fibre and wax. The aqueous binder can be any material dissolved in water that can act as a binder for the fibre/wax particles. In particular, the aqueous binder could be a zanthan gum, alginate, guar gum, locust bean extract, or a soluble protein such as hydrogenated animal or vegetable protein. However, the aqueous binder preferably comprises a carbohydrate. For example, the carbohydrate can be modified cellulose, such as methyl cellulose, hydroxyl-propyl methyl cellulose, hydroxyl-ethyl cellulose etc, a polysaccharide such as vegetable starch from corn, potato or wheat, including molasses from cane or beat sugar. The preferred aqueous binder is molasses or starch mucilage.

Molasses has been used before in fuels, but usually as an extender rather than a binder. As an extender the molasses is usually used in lower concentrations than in the present invention. EP2104727 and EP208034 discuss using a combustible binding agent, but apparently use a conventional method of manufacture. They do not add the aqueous binder in a separate stage to the cooled wax/fibre particles as in the present invention. Accordingly, in those methods, the binder would not sit around the wax/fibre particles as a matrix as in the present invention, but would be admixed with the wax.

Preferably the aqueous binder comprises 60% to 90% by weight solids, with the balance being water, preferably 70% to 80% solids. Molasses typically comprises around 70% solids, and 30% water.

Experimentation has shown that the best properties are achieved for the firelog when it comprises components in the following proportions: 15% to 50% by weight of the fibre component; 20% to 65% by weight of the wax component; and 15% to 30% by weight of the aqueous binder. More preferably the firelog comprises to 20% to 40% by weight of the fibre component, 30% to 60% by weight of the wax component and 21% to 25% by weight of the aqueous binder.

In addition to the fibre component, wax component and aqueous binder, the firelog can comprise further additives. For example, the firelog can comprise additives that produce a crackling sound that mimics the sounds produced during the burning of natural woodlogs, as described in EP1203046. Alternatively, the firelog could contain other additives that may include chemicals designed to colour or otherwise modify or retard the flame, add aroma, or change the burning characteristic of the firelog to more closely mimic the burning of natural logs.

The first step of the method of making a firelog of the present invention, (a), involves mixing the fibre component and the wax component together at a temperature above the drop point of the wax component. The aim of this step is to absorb as much wax component as possible into the fibre component. Accordingly, the wax component should be as hot as reasonably possible, and is generally hotter than the conventional prior art methods where the aim is that the wax component is mainly adsorbed onto rather than absorbed into the fibre component, so that it can still act as a binder. The wax component is preferably heated to at least 10° C. above it's drop point, preferably at least 20° C. above it's drop point. The hot mixed fibre component and wax component is often called "pasta".

The second step of the present invention, (b), involves simultaneously stirring and cooling the mixture of the fibre component and the wax component from step (a) to below the congealing temperature of the wax component. The aim of cooling the mixture is so that the wax component becomes a solid. To obtain solid particles of fibre and wax component, the mixture must be stirred, otherwise it would set as one solid block. The cooling can be forced or unforced where the mixture is simply left to cool to the ambient temperature.

The third step of the method, (c), involves mixing the cooled mixture of the fibre component and the wax component from step (b) with the aqueous binder. In this way the aqueous binder coats the fibre/wax particles and holds them in a matrix.

The final step of the method, (d) involves extruding the mixture of the fibre component, the wax component and the aqueous binder from step (c) to form a firelog.

As discussed above, the firelog which is made by the method of the invention is distinct from firelogs which are made in a single step mixing process. The aqueous binder coats the fibre/wax particles and binds them together. Examination of the firelog under a microscope would show a binder matrix if the method of the present invention was used, in contrast to the wax acting as a binder if a conventional one-stage mixing process was used. In addition, a further way to distinguish a firelog of the present invention from a firelog made by a conventional process would be to immerse the firelog in water. After prolonged immersion in water a firelog made by a conventional process, with a wax binder, would remains intact. In contrast, after prolonged immersion, a firelog according to the present invention would disassociate as the binder dissolves and releases the wax/fibre particles made in step a) of the method. The wax/fibre particles would tend to float to the surface of the water.

When the firelog is burnt, having the matrix of aqueous binder allows the aqueous binder to form a matrix of char. This can become extremely hard and ensures that the firelog maintains it integrity. This is in contrast to single step mixing methods of manufacturing firelogs, where the binder is wax, and does not form a solid matrix in the same way. Because of this effect, firelogs of the present invention can be used in a stove, as well as in an open fire.

The firelog of the present invention is preferably provided in packaging including instructions indicating that it can be used in a stove. During storage, water from the aqueous binder can migrate slowly into the fibre material, further hardening the firelog.

The firelog of the present invention preferably burns very cleanly. In particular, in a preferred embodiment the firelog produces smoke emissions of less than 5 grams per hour, preferably less than 4 grams per hour.

Example

A firelog was made comprising:
55% wax component—A fully hydrogenated palm oil, comprising mostly of mixture of palmatic and stearic and some minor lower carbon chain length fatty acids was used, as available from Cargill Europe, under the trade name AP835
25% fibre component—chipped coppice willow
20% aqueous binder—molasses [comprising 70% solids]

The wax component and fibre component were mixed at a temperature of 60° C. to 65° C., then were force-cooled to below 30° C. while the mixing was continued. The molasses was added to the cooled mixture and further mixed until homogeneous, and the mixture was extruded using a centre-line, screw extruder, (in this case the Bonnot 10 inch as made in the USA.)

The firelog was wrapped and sealed in a paper bag, which can be ignited by lighting.

The resultant firelog was named the "ZIP stove log" and sent for two different particle emission test, as follows:
EPA Method The particulate emission test is based on EPA Method 5G/28, but since testing is performed on a "cold" stove and the type of fuel differ etc, many of the test conditions cannot be fulfilled, so it is only the measuring part of the standard that is used.

A couple of pre-tests were performed for setting up test conditions. What defines a test period is the time it takes for the fuel load to be burnt. Using a "cold" stove makes it difficult to precisely determine when the fuel load has been burnt. Due to water trapped in the "cold" stove and the hot air that develops when firing the stove, the empty stove will not have the same weight before as after the test. The pre-test has shown that the scales zero-point is approximately 100 grams (scrapping out embers when the scale shows 100 grams will give that result that the empty stove shows a minus 100 gram scale reading). Therefore, the tests will stop when the scale reads approximately 100 grams and not 0 grams as would in an ordinary EPA test.

Two ZIP stove logs were used per test.

Figure 2:
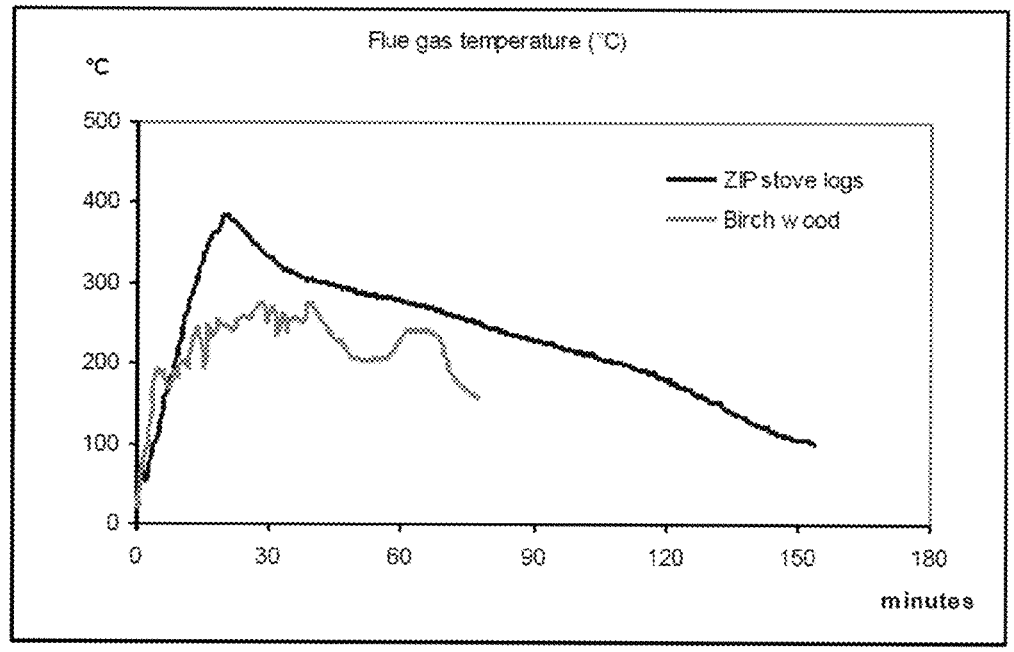
FIG. 2 is a graph showing the flue gas temperature in ° C. over time of a "Zip" firelog according to a preferred embodiment of the present invention versus birchwood.

A comparison test was performed with ZIP stove log and birch wood with the air-controller set at fully open. A little birch kindling on top of the logs was necessary to get the fire going. The results are as follows, and are illustrated in FIGS. 1 and 2.

| ZIP stove log versus birch wood | | |
|---|---|---|
| Fuel | ZIP stove log | Birch wood |
| Pieces of fuel | 2 | 2 logs, kindling and one firestarter |
| Water content (%) | 10 | 18 |
| Fuel Charge (kg) | 1,744 | 1,763 |
| Air-controller setting | Full open | Full open |
| Total burn time (hh:mm:ss) | 02:34:20 | 01:22:59 |
| Burnrate (kg/h dry basis) | 0.61 | 1.05 |
| Particulate matter on filters (mg) | 23.02 | 17.39 |
| Particulate emission  (g/h) | 4.87 | 6.37 |
| (g/kg) | 3.10 | 4.40 |

The test shows that ZIP stove logs burn for a long time, considerably longer than ordinary wood. ZIP stove logs burn well even from a cold and empty stove. This is not the case with ordinary wood logs. Particulate emission from ZIP stove logs are at a low level, competitive with ordinary wood. The ZIP stove logs burn at a very uniform speed.
British Standard Method Gravimetric smoke emission tests to BS 3841:1994 have been carried out for Standard Brands (Ireland) Ltd. on the ZIP Stove Log for submission as candidate authorised fuel. The logs were marked as being of a nominal weight of 1.1 kg.

A series of five tests with valid 2nd peak radiation levels was carried out on the firelog, the tests showed the mean rates of smoke emission to be 3.6 g $h^{-1}$. This is below the maximum permitted rate of 5.0 g $h^{-1}$ for fuels authorised for use in Smoke Control Areas. The tests are shown in the following table:

TABLE 4

| VALID GRAVIMETRIC SMOKE EMISSION TESTS | | | |
|---|---|---|---|
| Run No | 2nd Radiation Peak kW | Smoke Emission g $h^{-1}$ | Smoke Emission % of fuel charged |
| 1 | 1.82 | 3.3 | 0.08 |
| 2 | 1.81 | 3.7 | 0.09 |
| 3 | 1.86 | 4.4 | 0.11 |
| 4 | 2.17 | 3.5 | 0.10 |
| 5 | 2.17 | 3.2 | 0.10 |
| Mean | 1.97 | 3.6 | 0.10 |

The total sulphur content of the log was found to be below the maximum level of 2.0% (db) recommended by the Department for Environment, Food and Rural Affairs. The test results are shown in the following table:

TABLE 1

| ANALYTICAL CHARACTERISTICS | |
|---|---|
| PROXIMATE ANALYSIS (Dry Basis) | |
| Ash % | 3.0 |
| Volatile Mater % | 89.2 |
| Fixed Carbon % | 7.8 |
| ELEMENTAL (Dry Basis) | |
| Total Sulphur % | 0.20 |
| Chlorine % | 0.22 |

By way of comparison, Gravimetric smoke emission tests to BS 3841:1994 have also been carried out for Standard Brands (Ireland) Ltd. on the ZIP Croi na Tine Firelog. This is a firelog which is currently on the market in Ireland. The composition of the firelog is a simple two part mixture of coppice-willow derived cellulose fibre and natural derived components wax blend. The wax blend used is a carefully blended mixture of both saturated and unsaturated triglycerides, fatty alcohols, fatty esters, rosin acids, and other complex compounds found in tall oil pitch, a by-product of the paper making industry. Manufacture follows the conventional one-step method for this industry of mixing the fibre with molten wax blend at just above it's congealing point; subsequently, with continuous mixing; forcing the mixture to below the wax congealing point; and then offering the mixture to an extruder to form firelogs.

The logs were marked as being of a nominal weight of 1.1 kg.

A series of five two with valid 2nd peak radiation levels was carried out on the firelog, the tests showed the mean rates of smoke emission to be 5.7 g $h^{-1}$. This is above the maximum permitted rate of 5.0 g $h^{-1}$ for fuels authorised for use in Smoke Control Areas. The tests are shown in the following table:

Smoke Emission Tests on Samples of Zip Croi na Tine Firelogs

TABLE 1

| LBN 1/73 Firelogs | | | | |
|---|---|---|---|---|
| | Ignition charge | $2^{nd}$ peak radiant output | Smoke emission | |
| Test number | No. of logs | kW | % fuel charged | g $h^{-1}$ |
| 1 | 1½ | 1.89 | 0.30 | 5.3 |
| 2 | 1½ | 2.06 | 0.39 | 6.1 |
| Mean | 1½ | 1.98 | 0.35 | 5.7 |

The tests show that the current firelog, which is made by a conventional single mixing step method, and contains saturated waxes does not burn as cleanly as the firelog made according to the present invention, as above.

What is claimed is:

1. A method of making a firelog, wherein the firelog comprises a fibre component, a wax component and an aqueous binder, the method comprising the steps of:
   (a) mixing the fibre component and the wax component together at a temperature above the drop point of the wax component;
   (b) simultaneously stirring and cooling the mixture of the fibre component and the wax component from step (a) to below the congealing temperature of the wax component;
   (c) mixing the cooled mixture of the fibre component and the wax component from step (b) with the aqueous binder to provide solid particles comprising wax component and fibre component in a matrix of aqueous binder; and then
   (d) extruding the mixture of the fibre component, the wax component and the aqueous binder from step (c) to form a firelog.

2. A method according to claim 1, wherein the firelog comprises 15% to 50% by weight of the fibre component, 20% to 65% by weight of the wax component and 15% to 30% by weight of the aqueous binder.

3. A method according to claim 1, wherein the firelog comprises 20% to 40% by weight of the fibre component, 30% to 60% by weight of the wax component and 21 to 25% by weight of the aqueous binder.

4. The method according to claim 1, wherein the wax component comprises by weight at least 90% fully saturated compounds.

5. The method according to claim 4, wherein the fully saturated compounds are selected from the group consisting of saturated triglycerides, saturated fatty acids, saturated fatty alcohols, saturated fatty esters or a mixture thereof.

6. A method according to claim 1, wherein the wax component has a congealing point of at least 48° C.

7. A method according to claim 1, wherein the wax component consists of non-petroleum derived compounds.

8. A method according to claim 1, wherein the wax component does not comprise unsaturated fatty triglycerides, unsaturated fatty acids, unsaturated fatty alcohols, unsaturated fatty esters, tall oil pitch, petroleum derived paraffin slack waxes, or petroleum derived microcrystaline slack waxes.

9. A method according to claim 1, wherein the aqueous binder comprises a carbohydrate.

10. A method according to claim 1, wherein in step (a) the wax component is heated to at least 10° C. above its drop point.

11. A firelog which is made by the method of claim 1.

12. A firelog according to claim 11, wherein the firelog is provided in packaging including instructions indicating that it can be used in a stove.

13. A firelog according to claim 11, that produces smoke emissions of less than 5 g/hour.

14. A method of using the firelog of claim 11 comprising adding the firelog to an open fire or in a stove.

* * * * *